Patented Dec. 25, 1945

2,391,474

UNITED STATES PATENT OFFICE 2,391,474

FOOD COMPOSITION

Sidney Musher, New York, N. Y., assignor to Musher Foundation Incorporated, New York, N. Y., a corporation of New York No Drawing. Application June 4, 1943, Serial No. 489,691

11 Claims. (Cl. 99—83)

This invention relates to the production of food compositions containing in aqueous dispersion a finely divided special fraction of dehulled oats which food composition has been heated to an elevated temperature and whereby the stringy characteristics of the finely special fraction of dehulled oats has been substantially overcome.

It has been observed that when this finely divided special fraction of dehulled oats is dispersed in water, liquid whole or skim milk or similar aqueous medium in the amount of 1 part of total solids to between 4 and 8 parts of water, and particularly while there are also present 3 to 8 parts and desirably 4 to 6 parts of a sugar to each part of the finely divided oat fraction, after the product has been boiled or heated to elevated temperatures such as to between 170° F. and 210° F., the product, even after cooling has a stringy, gummy appearance and when picked up in a spoon, for example, long strands of the dispersed finely divided oat fraction hang down from the spoon, making the product objectionable for some purposes.

An object of the present invention is therefore to provide a means for substantially overcoming the stringy characteristic of a finely divided oat so that when the oat is boiled in water or milk desirably containing some sugars, and particularly after the product has been cooled or chilled, the objectionable characteristics will have been substantially overcome and the product may be picked up with a spoon without difficulty and without pulling into long strings or strands.

Still further objects and advantages will appear from the more detailed description set forth below, it being understood, however, that this more detailed description is given by way of illustration and explanation only and not by way of limitation, since various changes therein may be made by those skilled in the art without departing from the scope and spirit of the present invention.

It has now been found that when there is incorporated with the finely divided special dehulled oat between 10% and 35% by weight of gelatin against the weight of the finely divided special fraction of dehulled oats and the combination heated to between 170° F. and 210° F. or more in water or milk and particularly where there are also present about 4 to 6 parts of a sugar to each part of the special fraction of oats, the stringy characteristics are substantially destroyed although the other characteristics of the product are fully retained. These stringy characteristics are particularly observed where 1 part of the finely divided special fraction of dehulled oats or of the special oat-sugar combination is heated with between 4 and 8 parts of water or milk whereas in accordance with the procedures of the present invention the stringy characteristics are substantially destroyed.

For example, a composition including 70% finely divided special fraction of dehulled oats and 30% of a 250 Bloom gelatin, when added to water in an amount of 1 part of the special oat-gelatin combination and 6 parts of water and then heated to boiling for several minutes followed by allowing to cool and chilling, may be picked up with a spoon and will cut sharply without developing any stringy characteristic as is observed when gelatin is omitted.

This is particularly observed in a combination containing, for example, 1 part of the special oat gelatin combination, 4 to 6 parts of a sugar to each part of the special fraction of oats, and 4 to 8 parts of water or liquid whole or skim milk to each part of the special oat-gelatin-sugar combination.

Among the sugars there may be included sucrose, dextrose, glucose, corn syrup, molasses or other similar sugar product.

This particular fraction of oats is best prepared by first milling the oats to remove the cellulosic hulls and exterior, leaving the oat groats. These oat groats are then treated to remove the starch and to concentrate the high protein portion thereof.

In treating these groats to obtain the relatively high protein fraction, the groats are ground to such an extent that at least 60% and desirably 80% or more thereof will pass through a screen or mesh or bolting cloth having a fineness in excess of 60 mesh and desirably in excess of 90 and 100 mesh. It is the residue which is left after such grinding and screening or bolting and which, when boiled with from 4 to 8 parts of water or milk for each part of the special oat residue and particularly where there are also present 3 to 8 parts of a sugar to each part of residue, possesses unusually great stringy characteristics.

This special fraction of oats will have a protein content in excess of about 20% and generally in excess of 22%. At the same time the starch content of this fraction will be much less than the starch content of oat flour.

For example, in separating the relatively high starch fraction from the relatively low starch fraction to obtain the relatively low starch fraction, the groats are ground so that a major proportion thereof, say 60% to 80%, will have a fineness in excess of 60 mesh and desirably at least 60% to 70% of the ground material will have a fineness of between 90 and 100 mesh.

Then the ground material is screened, preferably through a fine silk screen to remove all particles which will not go through a 60 mesh screen and preferably which will not go through a 90 to 100 mesh screen.

The oat material which goes through the screen will contain the relatively high starch fraction, whereas the material left on the screen will be relatively low in starch content.

The coarse fraction produced in this manner is desirably then finely ground, preferably to a mesh of at least 70 and desirably to at least 100 mesh.

In accordance with the procedures of the present invention, it has been found that where this combination of between 10% and 35% by weight of gelatin and 90% to 65% by weight of the finely divided special coarse fraction of oats is heated in water or milk to an elevated temperature such as to between 170° F. and 210° F. and particularly where there is also present at least between about 3 and 8 parts of a sugar to each part of the finely ground coarse fraction that the stringy characteristics of this special oat fraction are substantially destroyed.

This effect of breaking the stringy characteristics of the finely divided special fraction of dehulled oats has been observed only by the treatment with gelatin in the aforesaid manner and although tests have been conducted with other types of materials which in themselves have no objectionable stringy characteristic, similar beneficial results have not been obtained.

Where desired, the combination of the finely divided special fraction of dehulled oats and the gelatin may be combined with a sugar and then heated in a smaller amount of water or liquid whole or skim milk to an elevated temperature in excess of 200° F. or even under pressure to a temperature of 235° F. to 245° F. to produce a highly plastic product and which product may subsequently be combined with additional water or milk.

For example, the special oat-gelatin combination may be added to water or milk containing between 65% and 85% and desirably about 70% of a sugar such as dextrose, sucrose or glucose, the gelatin being present in an amount of between 10% and 35% against the weight of the special oat fraction and the sugar being present in an amount of between 3 and 8 parts to each part of the special oat fraction. The special oat fraction, gelatin and sugar may first be combined and then added to the water or milk or the special oat-gelatin combination may be added direct to the sugar solution. For example, one part of water or milk may be combined with 3 to 8 parts of the special oat-gelatin-sugar combination and desirably 1 part of water or milk may be combined with 4 to 6 parts of the special oat-gelatin-sugar combination. The combined materials may then be heated to an elevated temperature in excess of 200° F. and desirably may be continuously boiled until a temperature of 225° F. to 245° F. is reached. Under these circumstances, no starch gelatinization occurs.

While maintaining the product at this elevated temperature, it may be poured into molds or forms and allowed to cool and solidify. The solid product in this form containing the special oat gela- tin combination which has been heated in the concentrated sugar solution, may then be added to water or milk to be dispersed therein on the basis of 4 to 8 parts of the water or milk to each part of the special oat-gelatin-sugar solids and heated to between 170° F. and 210° F. followed by allowing to cool to obtain the non-stringy desirable results of the present invention.

The present application is a continuation in part of applications, Serial No. 401,967 filed July 11, 1941, entitled "Water thickening agents and methods of making the same," and Serial No. 463,651, filed November 28, 1942, entitled "Ice cream compositions."

Having described my invention, what I claim is:

1. A food composition comprising a heated aqueous dispersion of a combination of a finely divided special fraction of dehulled oats and gelatin, said special fraction of dehulled oats containing in excess of about 20% total protein and having a relatively low starch and a relatively high protein content as compared to dehulled oats, said gelatin being present in an amount of between 10% and 35% against the weight of the oat fraction, said composition being substantially free of stringy characteristics.

2. A food composition comprising a heated aqueous dispersion of a combination of a finely divided special fraction of dehulled oats and gelatin, said special fraction of dehulled oats containing in excess of about 20% total protein and having a relatively low starch and a relatively high protein content as compared to dehulled oats, said gelatin being present in an amount of between 10% and 35% against the weight of the oat fraction, said composition being substantially free of stringy characteristics, the aqueous medium being present in an amount of 4 to 8 parts to each part of the combination.

3. A food composition comprising a heated aqueous dispersion of a combination of a finely divided special fraction of dehulled oats, gelatin and a sugar, said special fraction of dehulled oats containing in excess of about 20% total protein and having a relatively low starch and a relatively high protein content as compared to dehulled oats, said gelatin being present in an amount of between 10% and 35% against the weight of the oat fraction, said composition being substantially free of stringy characteristics.

4. A food composition comprising a heated aqueous dispersion of a combination of a finely divided special fraction of dehulled oats, gelatin and a sugar, said special fraction of dehulled oats containing in excess of about 20% total protein and having a relatively low starch and a relatively high protein content as compared to dehulled oats, said gelatin being present in an amount of between 10% and 35% against the weight of the oat fraction, the sugar being present in an amount of between 3 and 8 parts to each part of the oat fraction, said composition being substantially free of stringy characteristics.

5. A method of producing a heated oat composition substantially free of stringy characteristics which comprises heating a combination of a finely divided special fraction of dehulled oats and gelatin in an aqueous medium to a temperature of at least 170° F., gelatin being present in an amount of between 10% and 35% against the weight of the oat fraction, the aqueous medium being present in an amount of 4 to 8 parts to each part of the combination.

6. A method of producing a heated oat composition substantially free of stringy characteristics which comprises heating a combination of a finely divided special fraction of dehulled oats, gelatin and a sugar in an aqueous medium to a temperature of at least 170° F., gelatin being present in an amount of between 10% and 35% against the weight of the oat fraction and the sugar being present in an amount of between 3 and 8 parts to each part of the oat fraction, the aqueous medium being present in an amount of 4 to 8 parts to each part of the combination.

7. A food composition comprising a heated aqueous dispersion of a combination of a finely divided special fraction of dehulled oats and gelatin, said special fraction of dehulled oats being substantially free of those particles which will go through a 60 mesh when the dehulled oats are ground to a fineness that will permit a major proportion thereof to pass through a 60 mesh screen, said gelatin being pressent in an amount of between 10% and 35% against the weight of the oat fraction, said composition being substantially free of stringy characteristics.

8. A food composition comprising a heated aqueous dispersion of a combination of a finely divided special fraction of dehulled oats and gelatin, said special fraction of dehulled oats being substantially free of those particles which will go through a 60 mesh screen when the dehulled oats are ground to a fineness that will permit 80% thereof to pass through a 60 mesh screen, said gelatin being present in an amount of between 10% and 35% against the weight of the oat fraction, said composition being substantially free of stringy characteristics.

9. A method of producing a novel heated oat composition substantially free of stringy characteristics which comprises heating a combination of a finely divided special fraction of dehulled oats and gelatin in an aqueous medium to a temperature of at least 170° F., said special fraction of dehulled oats being substantially free of those particles which will go through a 60 mesh screen when the dehulled oats are ground to a fineness that will permit a major proportion thereof to pass through a 60 mesh screen, said gelatin being present in an amount of between 10% and 35% against the weight of the oat fraction, the aqueous medium being present in an amount of 4 to 8 parts to each part of the combination.

10. A method of producing a novel heated oat composition substantially free of stringy characteristics which comprises heating a combination of a finely divided special fraction of dehulled oats, gelatin and a sugar in an aqueous medium to a temperature of at least 170° F., said special fraction of dehulled oats being substantially free of those particles which will go through a 60 mesh screen when the dehulled oats are ground to a fineness that will permit a major proportion thereof to pass through a 60 mesh screen, said gelatin being present in an amount of between 10% and 35% against the weight of the oat fraction and the sugar being present in an amount of between 3 and 8 parts to each part of the oat fraction, the aqueous medium being present in an amount of 4 to 8 parts to each part of the combination.

11. A method of producing a novel heated oat composition substantially free of stringy characteristics which comprises heating a combination of a finely divided special fraction of dehulled oats, gelatin and a sugar in an aqueous medium to a temperature of at least 170° F., said special fraction of dehulled oats being substantially free of those particles which will go through a 60 mesh screen when the dehulled oats are ground to a fineness that will permit 80% thereof to pass through a 60 mesh screen, the gelatin being present in an amount of between 10% and 35% against the weight of the oat fraction and the sugar being present in an amount of between 3 and 8 parts of the oat fraction, the aqueous medium being present in an amount of 4 to 8 parts to each part of the combination.

SIDNEY MUSHER.